United States Patent [19]

Ishizaka et al.

[11] Patent Number: 5,360,156
[45] Date of Patent: Nov. 1, 1994

[54] WELDING MANAGEMENT APPARATUS

[75] Inventors: Yuji Ishizaka; Takashi Katanosaka; Osamu Masuda; Hiroyasu Kimura, all of Tokyo, Japan

[73] Assignee: Kabushiki Kaisha Meidensha, Tokyo, Japan

[21] Appl. No.: 104,505

[22] Filed: Aug. 9, 1993

Related U.S. Application Data

[62] Division of Ser. No. 20,373, Feb. 22, 1993, Pat. No. 5,265,787.

[30] Foreign Application Priority Data

| Mar. 25, 1992 | [JP] | Japan | 4-066726 |
| Apr. 7, 1992 | [JP] | Japan | 4-084264 |
| Apr. 20, 1992 | [JP] | Japan | 4-099372 |
| May 25, 1992 | [JP] | Japan | 4-131263 |
| May 25, 1992 | [JP] | Japan | 4-131264 |

[51] Int. Cl.$^5$ .................. B23K 13/02; B23K 101/06
[52] U.S. Cl. .................. 228/17.5; 228/147; 228/173.7; 228/265; 219/61.2
[58] Field of Search .......... 228/125, 173.5, 151, 228/147, 17, 17.5; 72/52, 181; 29/33 D; 219/59.1, 61.2, 67

[56] References Cited

U.S. PATENT DOCUMENTS

| 2,188,326 | 1/1940 | Windsor et al. | 228/17.5 |
| 3,360,177 | 12/1967 | Enkvist | 228/17.5 |
| 3,755,884 | 9/1973 | Dupy | 228/125 |
| 4,081,648 | 3/1978 | Rudd et al. | 219/59.1 |
| 4,254,323 | 3/1981 | Takamatsu et al. | 219/110 |
| 4,280,137 | 7/1981 | Ashida et al. | 358/101 |
| 4,649,256 | 3/1987 | Minamida et al. | 219/121 LD |
| 4,998,209 | 3/1991 | Vuichard et al. | 364/513 |
| 5,148,960 | 9/1992 | Abbey, III et al. | 228/17.5 |

FOREIGN PATENT DOCUMENTS

| 530877 | 10/1957 | Belgium . |
| 0353409 | 2/1990 | European Pat. Off. . |
| 2575686 | 7/1986 | France . |
| 474375 | 9/1975 | U.S.S.R. | 228/17.5 |
| 499915 | 3/1976 | U.S.S.R. | 228/17.5 |

OTHER PUBLICATIONS

*Soviet Inventions Illustrated,* Section Ch, Week 8803, 21 Jan. 1988, Derwent Publications Ltd., Abstract of SU-A-1 315 052 (Magn Mine Metal Ins).
Patent Abstracts of Japan, vol. 15, No. 381 (M-1162 26 Sep. 1991 abstract of JP-A-3155479 Jul. 3, 1991.
Patent Abstracts of Japan, vol. 7, No. 104, (M-212)(1249) 6 May 1982 abstract of JP-A-58025883 16 Feb. 1983.
Patent Abstracts of Japan, vol. 7, No. 63 (M-200)(1206) 16 Mar. 1983 abstract of JP-A-57206581 17 Dec. 1982.

*Primary Examiner*—Samuel H. Heinrich
*Attorney, Agent, or Firm*—Foley & Lardner

[57] ABSTRACT

A welding management apparatus for use with a tube production machine. A workpiece fed from a roll of metal strip is formed in a tubular formation having side surfaces opposite to each other. An upsetting pressure is applied to joint the opposite side surfaces of the workpiece at a jointing point. A high frequency power is supplied to the workpiece to weld the opposite side surfaces at the jointing point so as to produce a metal tube member. The welding management apparatus comprises a camera positioned to have a visual field including the jointing point for producing a video signal indicative of an image including an area luminous with a pre-arc produced in the visual field. An image processor converts the video signal into a luminance distribution pattern. An inference unit is provided for inferring a defective welding condition based upon the luminance distribution pattern. The inference unit includes an alarm unit for producing an alarm when a defective welding condition is inferred. The tube production machine employs squeeze rollers which are one piece members.

9 Claims, 19 Drawing Sheets

WELDING MANAGEMENT APPARATUS

This application is a divisional of application Ser. No. 08/020,373, filed Feb. 22, 1993, now U.S. Pat. No. 5,265,787.

BACKGROUND OF THE INVENTION

This invention relates to a welding management apparatus suitable for use with a tube production machine.

Tube production machines have been employed to produce a metal tube member by forming a workpiece fed from a roll of metal strip in a tubular formation having side surfaces opposite to each other, providing an upsetting pressure to butt the opposite side surface of the workpiece at a jointing point, and supplying a high frequency power to the workpiece to weld the opposite side surfaces at a welding point. It is the conventional practice to adjust the intensity of the welding heat generated at and near the jointing point by controlling the high frequency power to the workpiece based upon various tube producing conditions that are sensed during the operation of the tube production machine. However, the welding heat intensity is dependent upon a great number of tube producing conditions. It is very difficult, if not impossible, to adjust the welding heat intensity based upon all of the tube producing conditions.

SUMMARY OF THE INVENTION

It is a main object of the invention to provide a welding management apparatus which can achieve excellent welding heat control with ease.

Another object of the invention is to provide an improved tube production machine which can produce tubes having a diameter of 8 mm or less.

There is provided, in accordance with the invention, a welding management apparatus for use with a tube production machine including first means for forming a workpiece fed from a roll of metal strip in a tubular formation having side surfaces opposite to each other, second means for providing an upsetting pressure to joint the opposite side surfaces of the workpiece at a jointing point, and third means for supplying a high frequency power to the workpiece to weld the opposite side surfaces at the jointing point so as to produce a metal tube member. The welding management apparatus comprises a camera positioned to have a visual field including the jointing point for producing a video signal indicative of an image including an area luminous with a pre-arc produced in the visual field, an image processor for converting the video signal into a luminance distribution pattern, and an inference unit for inferring a defective welding condition based upon the luminance distribution pattern. The inference unit includes means for producing an alarm when a defective welding condition is inferred.

In another aspect of the invention, there is provided a welding management apparatus for use with a tube production machine including first means for forming a workpiece fed from a roll of metal strip in a tubular formation having side surfaces opposite to each other, second means for providing an upsetting pressure to joint the opposite side surfaces of the workpiece at a jointing point, and third means for supplying a high frequency power to the workpiece to weld the opposite side surfaces at the jointing point so as to produce a metal tube member. The welding management apparatus comprises a camera positioned to have a visual field including the jointing point for producing a video signal indicative of an image including an area luminous with heat produced in the visual field, a masking member placed in front of the camera for partially masking the visual field from the camera to divide the luminous area into first and second sections corresponding to the respective side surfaces of the workpiece, an image processor for converting the video signal fed from the camera into a luminance distribution pattern, and an inference unit for inferring a defective welding condition based upon the luminance distribution pattern.

In another aspect of the invention, there is provided a welding management apparatus for use with a tube production machine including first means for forming a workpiece fed from a roll of metal strip in a tubular formation having side surfaces opposite to each other, second means for providing an upsetting pressure to joint the opposite side surfaces of the workpiece at a jointing point, and third means for supplying a high frequency power to the workpiece to weld the opposite side surfaces at the jointing point so as to produce a metal tube member. The welding management apparatus comprises a camera positioned to have a visual field including the jointing point for producing a video signal indicative of an image including an area luminous with heat produced in the visual field, a masking member placed in front of the camera, the masking member having a transparent window having lines extending in spaced-parallel relation to each other in a direction substantially normal to a direction of movement of the workpiece for dividing the visual field into a plurality of zones, an image processor for converting the video signal fed from the camera into luminance distribution patterns corresponding to the respective zones, and an inference unit for inferring a defective welding condition based upon the luminance distribution patterns.

In still another aspect of the invention, there is provided a tube production machine comprising means for forming a workpiece fed from a roll of metal strip in a tubular formation having side surfaces opposite to each other, and a pair of squeeze rollers for providing an upsetting pressure to joint the opposite side surfaces of the workpiece at a jointing point. Each of the squeeze rollers is a one-piece member having a cylindrical center portion, and upper and lower cylindrical end portions extending coaxially from the center portion. The center portion is formed in a side peripheral surface with an annular groove to define a path for the workpiece along with the annular groove of the other squeeze roller. The tube production machine also comprises a roller holder for bearing each of the squeeze rollers at the end portions thereof, and means for supplying a high frequency power to the workpiece to weld the opposite side surfaces at the jointing point so as to produce a metal tube member.

BRIEF DESCRIPTION OF THE DRAWINGS

This invention will be described in greater detail by reference to the following description taken in connection with the accompanying drawings, in which.

DETAILED DESCRIPTION OF THE INVENTION

Figure 1:
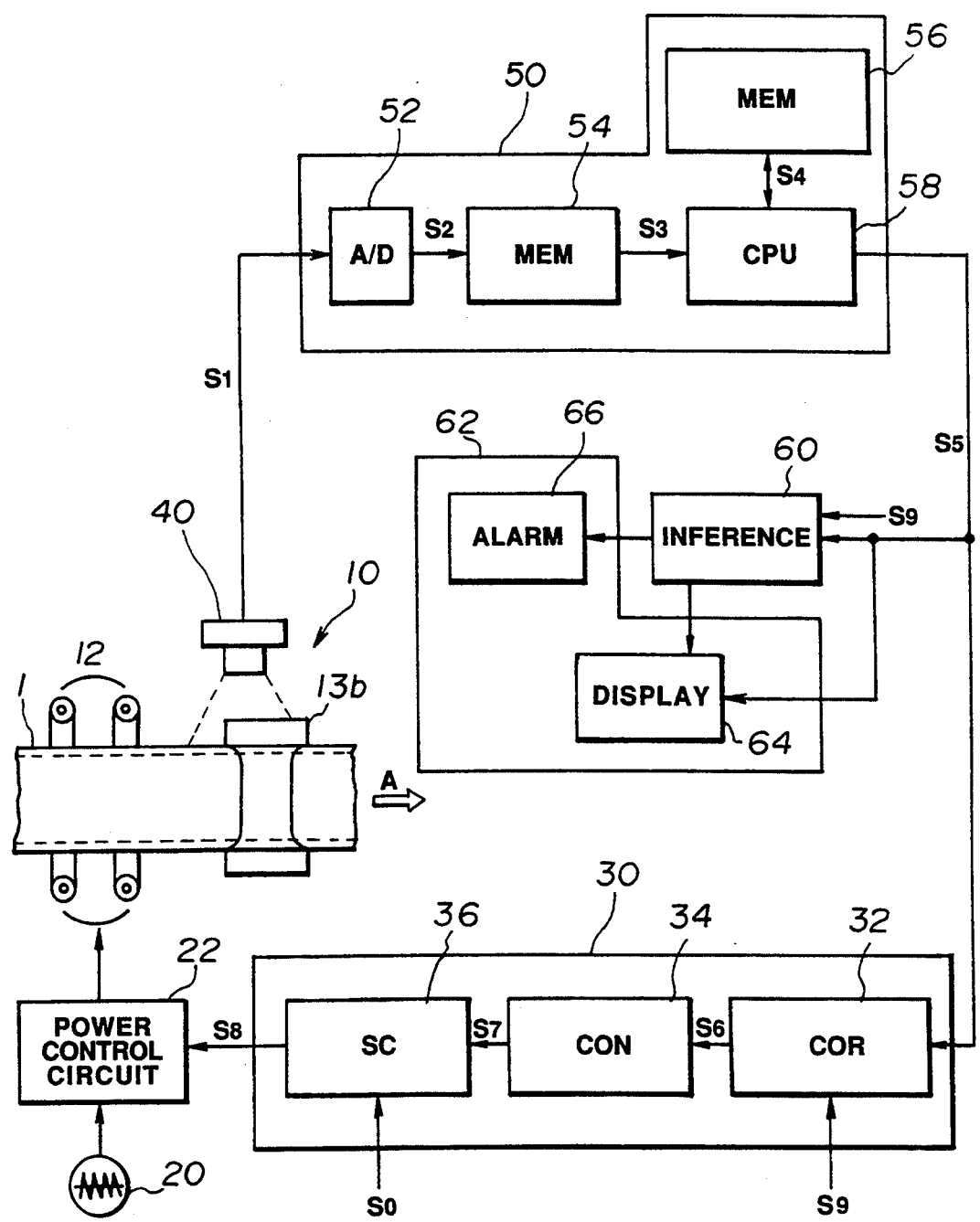
FIG. 1 is a schematic block diagram showing one embodiment of a welding management apparatus made in accordance with the invention.
Figure 2:
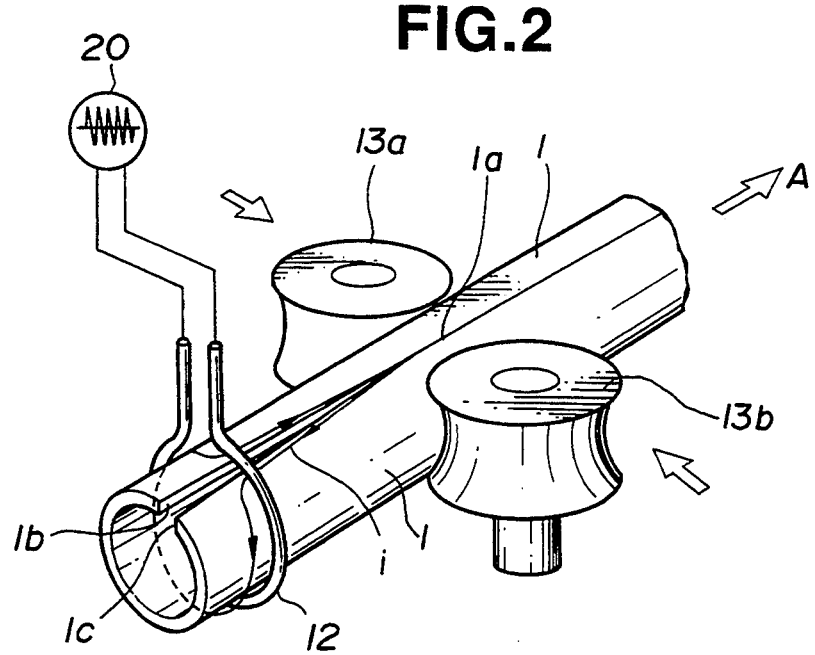
FIG. 2 is a fragmentary perspective view showing the welding section included in a tube production machine to which the invention is applicable.

With reference to the drawings, and in particular to FIG. 1, there is shown a schematic diagram of a welding management apparatus embodying the invention. Although the welding management apparatus will be described in connection with a tube production machine employing a high frequency induction welding unit, as shown in FIG. 2, it is to be understood that the invention is also applicable to other types of tube production machine. The tube production machine, generally designated by the numeral 10, employs forming rollers arranged in a number of stages to form a workpiece 1 fed from a roll of metal strip in a tubular formation. A pair of squeeze rollers 13a and 13b are positioned on the opposite sides of the workpiece 1 and they provide an upsetting pressure to joint the opposite side surfaces of the workpiece 1 at a jointing point 1a just upstream of a point intermediate between the squeeze rollers 13a and 13b, as best shown in FIG. 2. A heating coil 12 is positioned to surround the workpiece 1 at a position upstream of the jointing point 1a. The heating coil 12 is supplied with a high frequency power to produce a highly concentrated, rapidly alternating magnetic field so as to induce an electric potential in the workpiece 1. This electric potential causes heating because of $I^2 \cdot R$ losses at a welding point just downstream of the jointing point 1a where the opposite side surfaces 1b and 1c of the workpiece 1 are welded, as best shown in FIG. 2. The V-shaped gap, which is defined near the jointing point 1a by the opposite side surfaces 1b and 1c of the workpiece 1, is referred to as a V throat.

Figure 3:
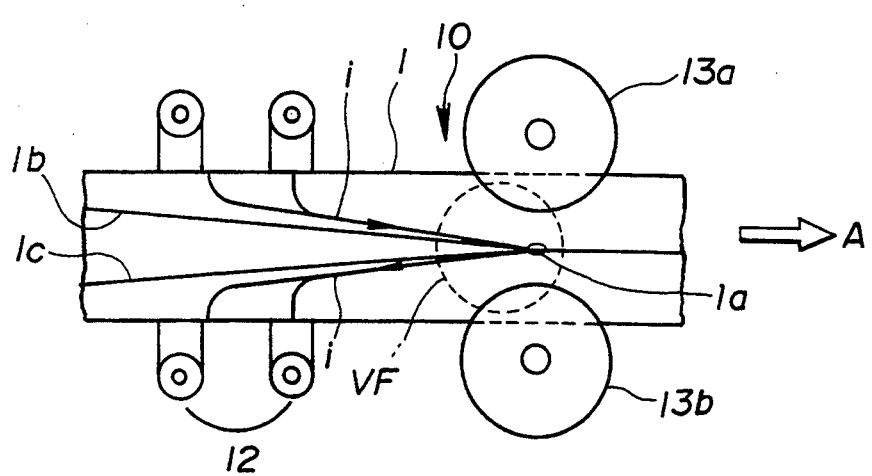
FIG. 3 is a fragmentary plan view showing a visual field of a camera used in the welding management apparatus of the invention.
Figure 4:
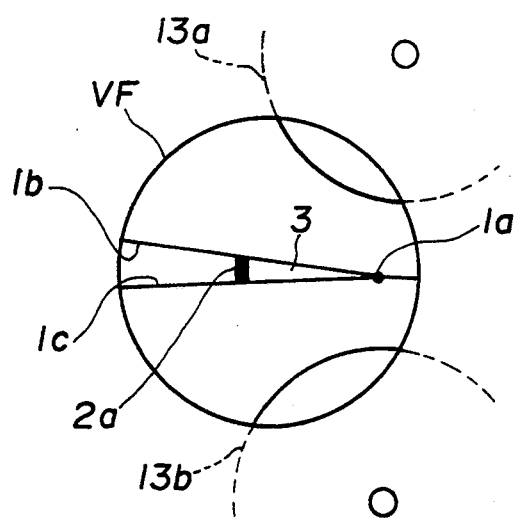
FIG. 4 is a fragmentary plan view showing a welding heat condition which may appear in the visual field of the camera.

The heating coil 12 is powered from a high frequency power source 20 through a power control circuit 22. The welding heat under which the workpiece 1 is welded at the welding point 1a, this being determined by the level of the power applied to the heating coil 12, is determined from calculations performed in a control unit 30. A camera 40 is positioned above the workpiece 1. The camera 40, which may be of the type having an M×N array of CCD elements, is directed to have a visual field VF including the jointing (or welding) point 1a, as shown in FIG. 3. FIG. 4 shows a welding condition which may appear in the vidual field VF of the camera 40. In this welding condition, the opposite side surfaces 1b and 1c are connected by melted metal 2 at a point 2a upstream of the jointing point 1a. The melted metal 2 moves violently between the points 1a and 2a and it cannot cover the whole area between the points 1a and 2c to form an aperture 3 behind the melted metal 2. An arc (referred to as pre-arc) occurs frequently at the point 2a. This welding condition results from an excessive welding heat. Preferably, the camera 40 is fixed certainly to suppress the movement of the vidual field VF within 0.1 mm at maximum. Noise will be introduced when the measuring point moves due to vibrations in the camera 40. It is also preferable that the introduced noise is less than 100 μm.

The image (luminance level pattern) formed on the CCD elements is scanned in a series of raster scan lines and converted into a video signal S1 for application to the image processing unit 50. It is to be understood that the image formed on the CCD elements has synthetical information on which various welding conditions are reflected. The image processing unit 50 receives a video signal from the camera 40 and digitally stores the inputted image. The stored image A is represented by an M×N array of pixels. Each pixel A(x,y) is assigned a value representation of its intensity. The image processing unit 50 scans the stored image A in a series of raster scan lines to convert it into a black/white image B represented by an array of pixels. Each pixel B(x,y) has a value of 0 or 1. B(x,y)=0 represents a white pixel, while B(x,y)=1 represents a black pixel. In order to avoid the influence of the vapor and other disturbances near the jointing point 1a, the image processing unit 51 may be arranged to differentiate the signal obtained when the stored image A is scanned in a series of raster scan lines and to convert the differentiated signal into the black/white image B. The image processing unit 50 counts the number of white pixels of the stored image B and produces an electric signal S5 corresponding to the counted white pixel number. The electric signal S5 represents the white area of the stored image B and, thus, the intensity of the welding heat. The image processing unit 50 may be arranged to produce the electric signal S5 by counting the number of white pixels arranged to form a longitudinal center line on the stored image. Preferably, the camera 40 has such a resolving power that the number of the pixels forming the white area (in this case pre-arc area) is 100 or more.

Figure 5:
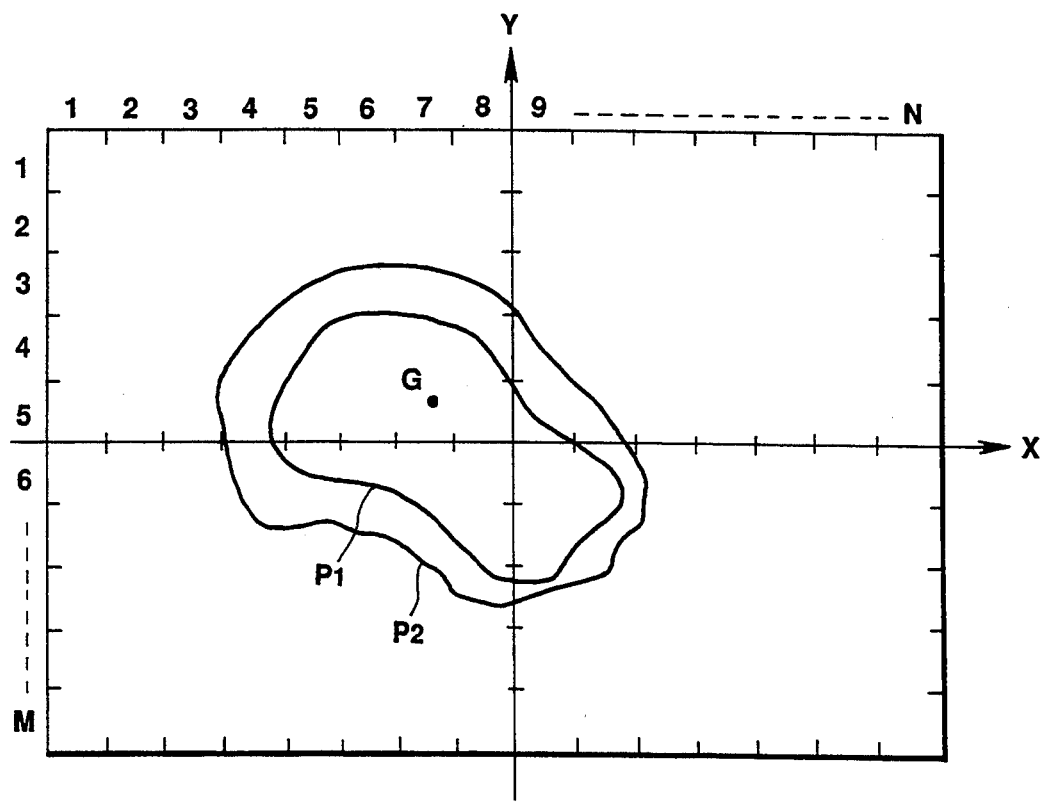
FIG. 5 is a diagram showing a luminance distribution pattern produced in the image processor.

The image processing unit 50 may include an analog-to-digital converter (A/D) 52 which receives the video signal S1 from the camera 40 and converts it into digital form having 128 (0 to 127) tones. That is, the luminance level (Cd/M$^2$) taken for each of the M×N array of CCD elements is converted into the corresponding digital signal. The digital signal S2 is applied from the A/D converter 52 to a first image memory (MEM) 54 which digitally stores an image of the visual field represented by an M×N array of pixels. Each pixel is assigned a value representative of its intensity (darkness). The stored image is scanned in a series of raster scan lines to convert it into a luminance (gray histogram) pattern. FIG. 5 shows one example of such a luminance pattern obtained for the welding condition described in connection with FIG. 4. The first luminous area surrounded by the circle P1 has the highest luminance level and it corresponds to the pre-arc produced at the point 2a. The second luminous area surrounded by the circles P1 and P2 has a luminance level less than the first luminous area and it corresponds to the workpiece portion surrounding the pre-arc. In FIG. 5, the letter G indicates the center of gravity of the first luminous area surrounded by the circle P1.

The image processing unit 50 also includes a second image memory (MEM) 56 which stores reference luminance patterns. The digital computer (CPU) 58 makes a determination as to whether or not the welding condition is appropriate by comparing the luminance pattern S3 transferred thereto from the first image memory 54 with the reference image patterns S4 successively transferred thereinto from the second image memory 56. For this purpose, the digital computer 58 may be arranged to compare the first luminous area surrounded by the circle P1 with the corresponding area of each of the reference luminance patterns. The first luminous area surrounded by the circle P1 corresponds to the area of the pre-arc produced at the point 2c and it corresponds to the intensity of the welding heat. Alternatively, the digital computer 58 may be arranged to compare the longitudinal length of the first luminous area surrounded by the circle P1 with the corresponding length of each of the reference luminance patterns. The longitudinal length of the first luminous area surrounded by the circle P1 corresponds to the length of the melted metal 2 and it corresponds to the intensity of the welding heat. The digital computer 58 produces a decision signal S5 indicative of the result of the comparison made in the image processing unit 50. The decision signal S5 is fed from the image processing unit 50 to the control unit 30.

The control unit 30 includes a correction factor calculating circuit (COR) 32, a signal converter circuit (CON) 34 and a signal control circuit (SCC) 36. The correction factor calculating circuit 32 receives the decision signal S5 from the digital computer 58 and a welding condition signal S9 and it calculates a correction factor based upon the received signals S5 and S9. The welding condition signal S9 may a sensor signal indicative of at least one of the measured values of high frequency power, high frequency impedance, welding rate, workpiece width, workpiece thickness, workpiece resistance, and the like parameters having an influence on the welding quality. The correction factor calculating circuit 32 produces a signal S6 indicating the calculated correction factor. The signal S6 is fed from the correction factor calculating circuit 32 to the signal converter circuit 34 which converts it into an electric signal S7. The electric signal S7 is applied to the signal control circuit 36 which compares it with a power setting reference signal S0 to produce a control signal S8 causing the power control circuit 22 to control the high frequency power to the heating coil 12.

The welding management apparatus also includes an inference section 60 and a monitor section 62. The monitor section 62 includes display and alarm units 64 and 66 connected to the inference section 60. The inference section 60 receives the signals S5 and S9 and infers the welding condition. The inference section 60 may ba arranged to utilize the area, length, circumference, inclination angle of the first luminous area obtained by the digital computer 58 to infer the welding condition. The inferred welding condition is presented on the display unit 64. The alarm unit 66 operates to provide an audible indication when the inferred welding condition is defective.

Figure 6:
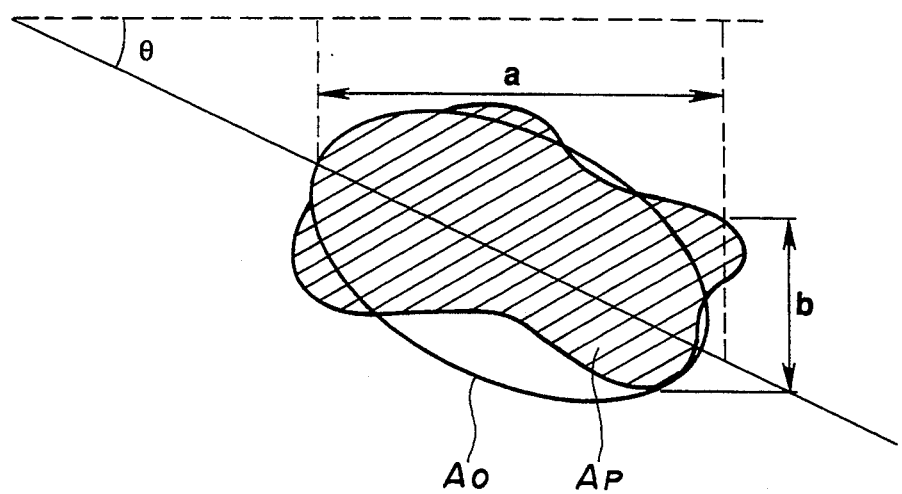
FIG. 6 is a diagram used in explaining the operation of the image processor.

The image processing unit 50 may be arranged to process the inputted image so as to provide an oval area Ao equivalent to the first luminous area Ap corresponding to the pre-arc, as shown in FIG. 6. The image processing unit 50 extracts at least one of characteristic features including the area of the equivalent oval area Ao, the length a of the major axis of the equivalent oval area Ao, the length b of the minor axis of the equivalent oval area Ao, the angle $\theta$ of inclination of the equivalent oval area Ao, the position of the gravity center of the equivalent oval area Ao, the length of the circumference of the equivalent oval area Ao, etc. The area of the equivalent oval area Ao corresponds to the magnitude of the heat (welding heat) inputted to the workpiece 1. For example, the number of the pixels forming the first luminous area Ao was 146 when the inputted heat is at its lower limit and was 950 when the input heat is at its upper limit. The angle $\theta$ of inclination of the equivalent oval area Ao may be used to determine whether the workpiece is formed well symmetrically. The position of the gravity center of the equivalent oval area Ao corresponds to the angle of the V throat defined by the opposite side surfaces 1b and 1c of the workpiece 1. These characteristic features are presented on the display unit 64. The inference section 60 receives the extracted characteristic feature from the image processing unit 50 and compares the received characteristic feature with upper and lower limits. If the received characteristic feature is out of the range defined by the upper and lower limits, the inference section 60 produces a command causing the alarm unit 66 to produce an audible indication.

Figure 7:
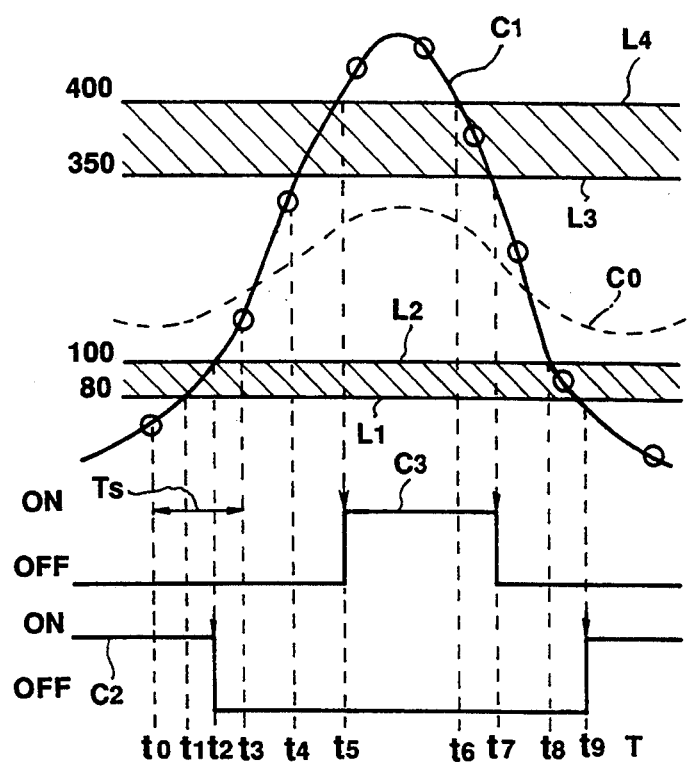
FIG. 7 is a diagram used in explaining the process for producing an alarm.

It is now assumed that the characteristic feature is the position of the gravity center of the equivalent oval area Ao. The inference section 60 compares this characteristic feature hysteretically with a higher value L2 (100 pixels) of the lower limit when the characteristic feature is increasing and with a lower value L1 (80 pixels) of the lower limit when the characteristic feature is decreasing, as shown in FIG. 7. Similarly, the inference section 60 compares the characteristic feature hysteretically with a higher value L4 (400 pixels) when the characteristic feature is increasing and with a lower value L3 (350 pixels) when the characteristic feature is decreasing. No alarm is produced from the alarm unit 66 as long as the characteristic feature varies within the acceptable range defined between the upper and lower limits, as indicated by the curve Co of FIG. 7. If the characteristic feature is out of the acceptable range, as indicated by the curve C1 of FIG. 7, the inference section 60 produces a command causing the alarm unit 66 to produce an alarm so as to indicate that the welding condition is defective.

The inference section 60 may be arranged to infer a cause of the defective welding condition based upon the characteristic feature changing out of the acceptable range defined between the upper and lower limits. In this case, the inference section 60 indicates the inferred cause on the display unit 64.

Figure 8:
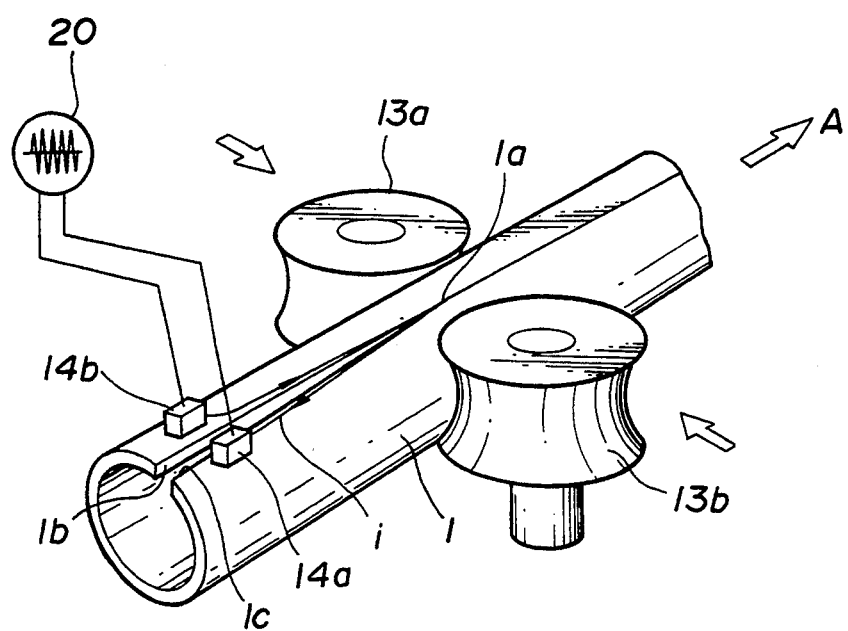
FIG. 8 is a fragmentary perspective view showing another type of welding section included in the tube production machine to which the invention is applicable.

The invention is also applicable to another type of welding machine as shown in FIG. 8. This welding machine includes a pair of contacts 14a and 14b placed in contact with the workpiece 1 on the opposite sides of a line along which welding is required. The contacts 14a and 14b are supplied with a high frequency power to produce an electric potential in the workpiece 1. This electric potential causes heating because of $I^2R$ losses at the jointing point 1a where the opposite side surfaces 1b and 1c of the workpiece 1 are welded.

Figure 9:
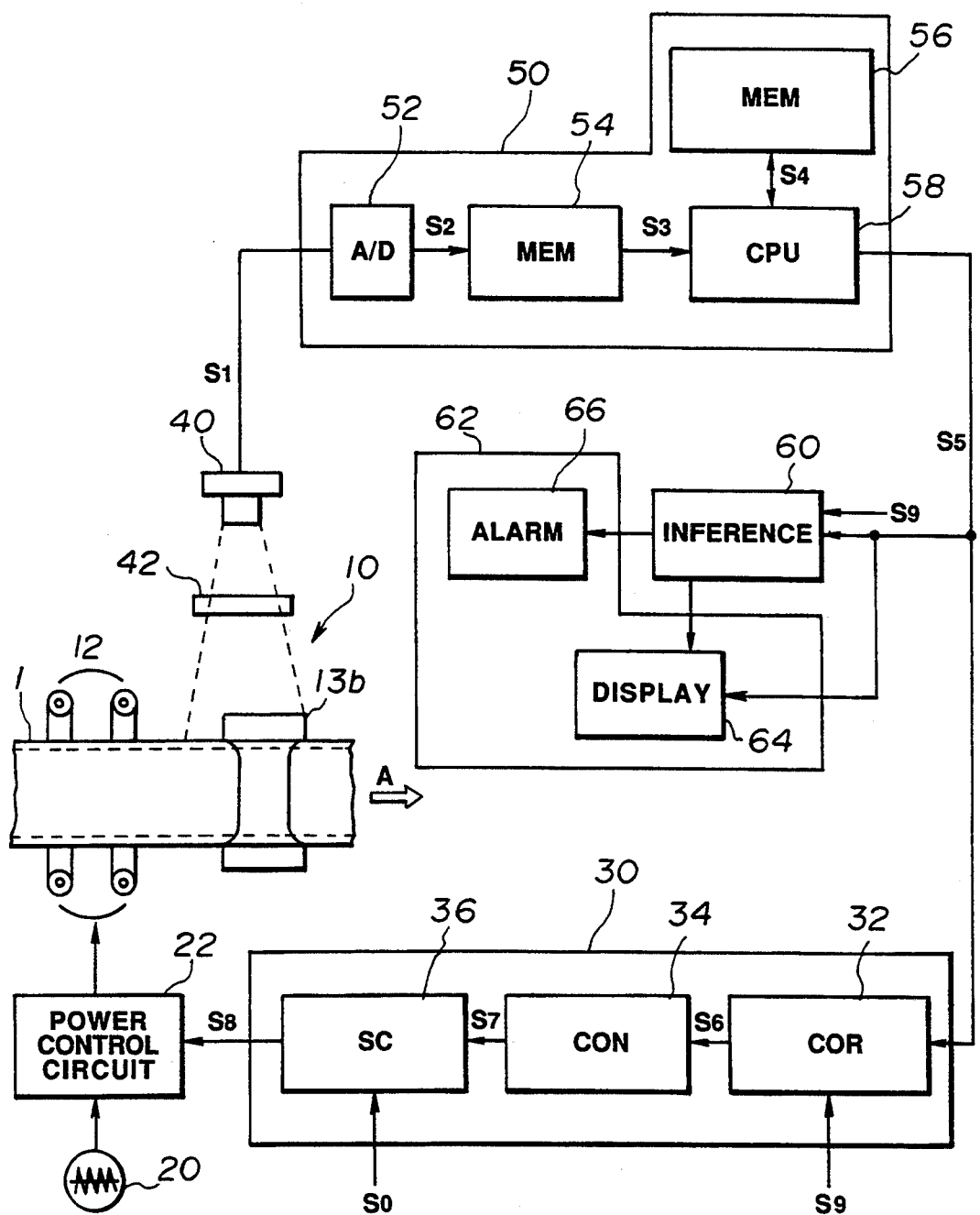
FIG. 9 is a schematic block diagram showing a second embodiment of the welding management apparatus of the invention.
Figure 10:
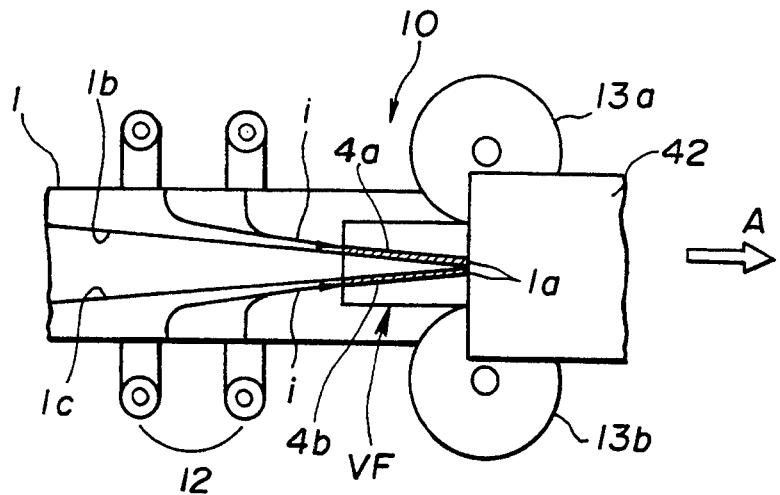
FIG. 10 is a fragmentary plan view showing a visual field of a camera used in the welding management apparatus of the invention.
Figure 11:
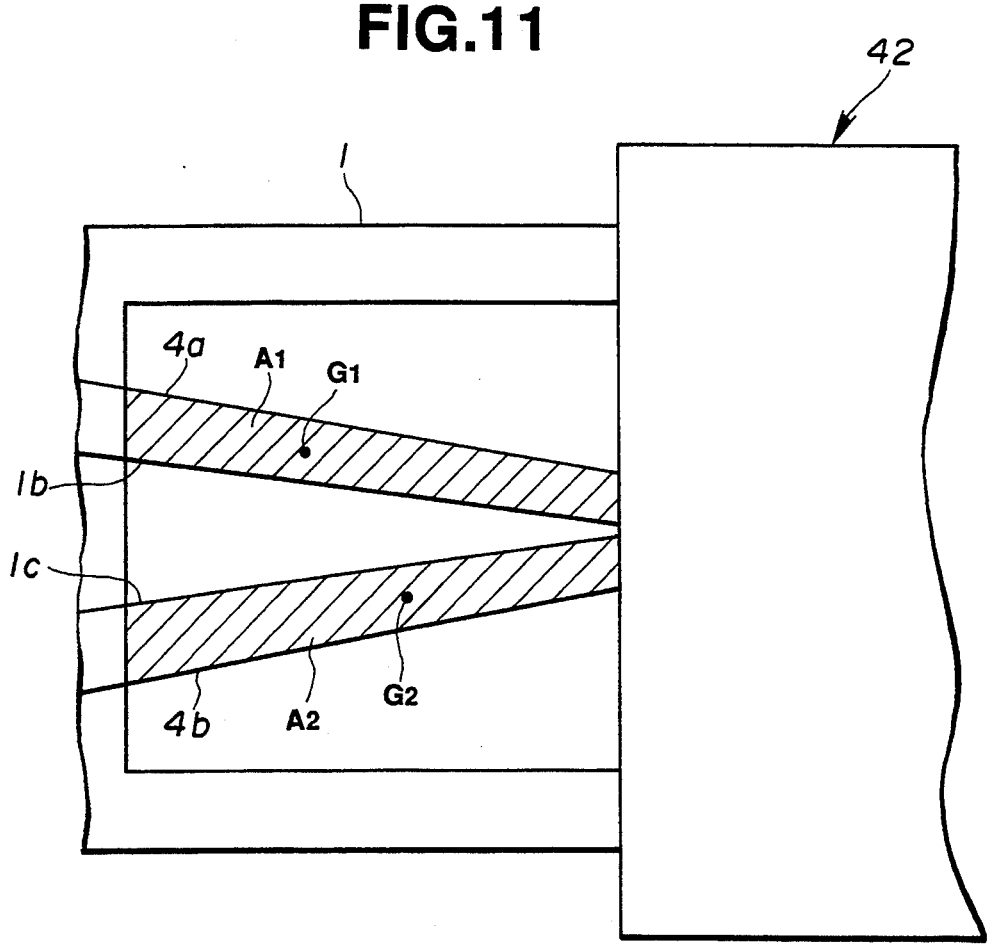
FIG. 11 is a fragmentary plan view showing a welding heat condition which may appear in the visual field of the camera.
Figure 12:
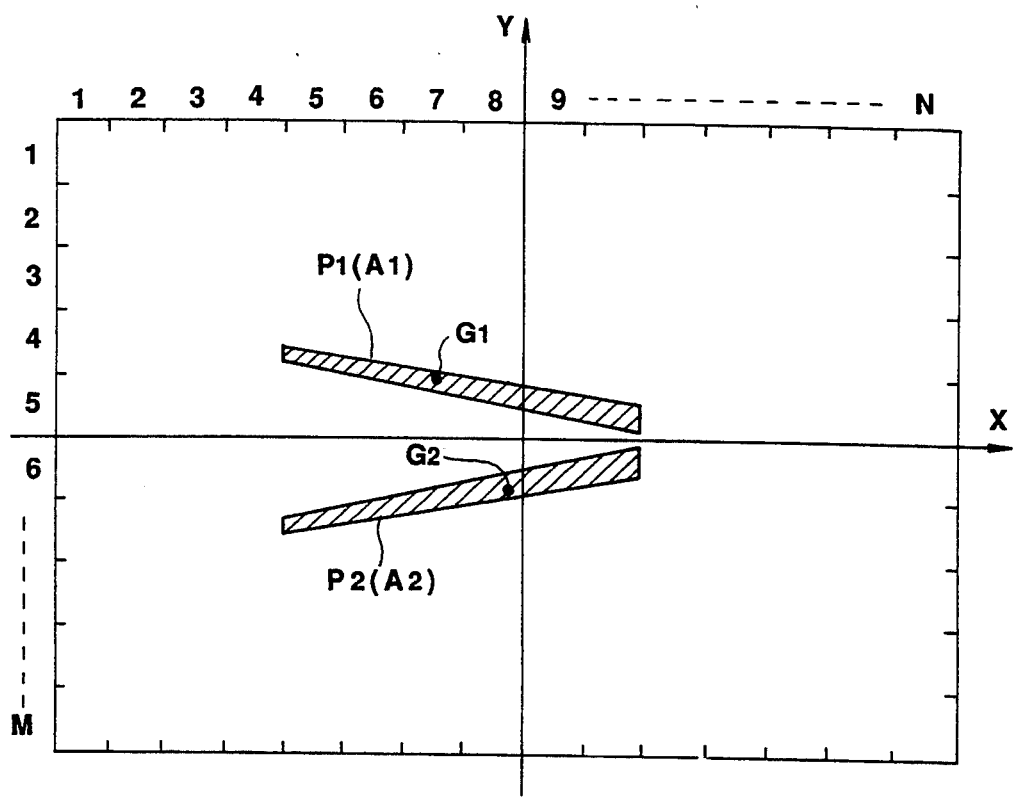
FIG. 12 is a diagram showing a luminance distribution pattern produced in the image processor.

Referring to FIGS. 9 and 10, there is illustrated a second embodiment of the welding management apparatus of the invention. The second embodiment is substantially the same as the first embodiment except for a masking member 42 provided in front of the camera 40 to mask the workpiece portion downstream of the welding point 1a. With the use of the masking member 42, the luminous area corresponding to the heated portion of the workpiece 1 is divided into two portions 4a and 4b, as shown in FIG. 11. FIG. 12 shows one example of a luminance pattern obtained for the welding condition shown in FIG. 11. The area P1 corresponds to the area 4a of FIG. 11 and the area P2 corresponds to the area 4b of FIG. 11. The letter G1 indicates the center of gravity of the area 4a and the letter G2 indicates the center of gravity of the area 4b.

Figure 13:
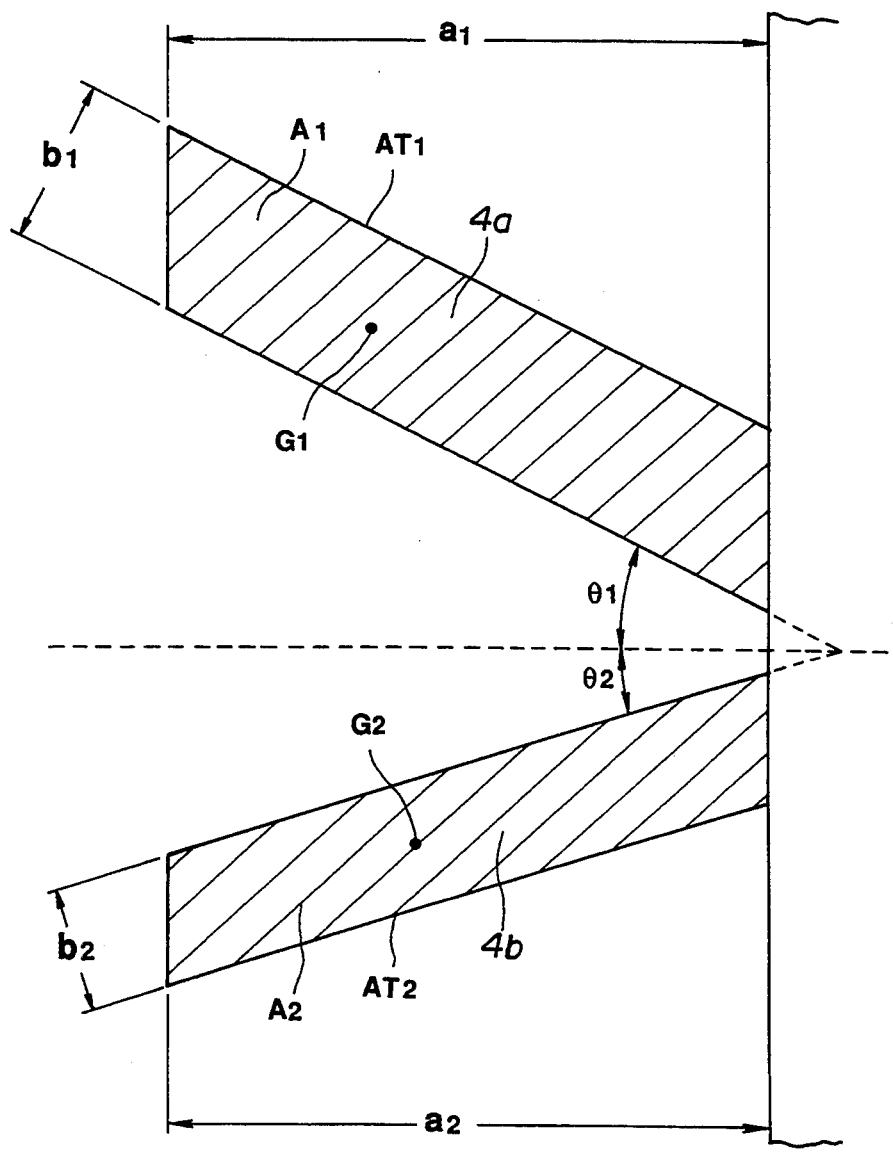
FIG. 13 is a diagram used in explaining the operation of the image processor.

In this embodiment, the image processing unit 50 is arranged to process the inputted image so as to provide a trapezoid area AT1 equivalent to the area 4a and a trapezoid area AT2 equivalent to the area 4b, as shown in FIG. 13. The image processing unit 50 extracts the areas A1 and A2 of the respective trapezoid areas AT1 and AT2, the lengths a1 and a2 of the major axes of the respective trapezoid areas AT1 and AT2, the lengths b1 and b2 of the minor axes of the respective trapezoid areas AT1 and AT2, the positions G1 and G2 of the gravity centers of the respective trapezoid areas AT1 and AT2, and the angles $\theta 1$ and $\theta 2$ of inclination of the respective trapezoid areas AT1 and AT2. The image processing unit 50 superimposes at least one of characteristic features calculated as $(A1+A2)/2$, $(A1-A2)/(A1+A2)^{\frac{1}{2}}$, $(G1+G2)/2$, $|G1-G2|/(G1\times G2)^{\frac{1}{2}}$, and $(|\theta 1|-|\theta 2|)/(\theta 1\times \theta 2)^{\frac{1}{2}}$, on the signal S5. The characteristic feature $(A1+A2)/2$ corresponds to the magnitude of the welding heat, the thickness of the workpiece 1 and the workpiece feeding speed. The characteristic feature $(A1-A2)/(A1+A2)^{\frac{1}{2}}$ corresponds to the degree to which the tubular formation of the workpiece 1 is balanced. The characteristic feature $(G1+G2)/2$ corresponds to the upsetting pressure and the width of the workpiece 1. The characteristic feature $|G1-G2|/(G1\times G2)^{\frac{1}{2}}$ corresponds to the workpiece forming condition. The characteristic feature $(|\theta 1|-|\theta 2|)/(\theta 1\times \theta 2)^{\frac{1}{2}}$ corresponds to the workpiece forming stability, workpiece thickness change and the degree to which the rollers are worn.

Figure 14:
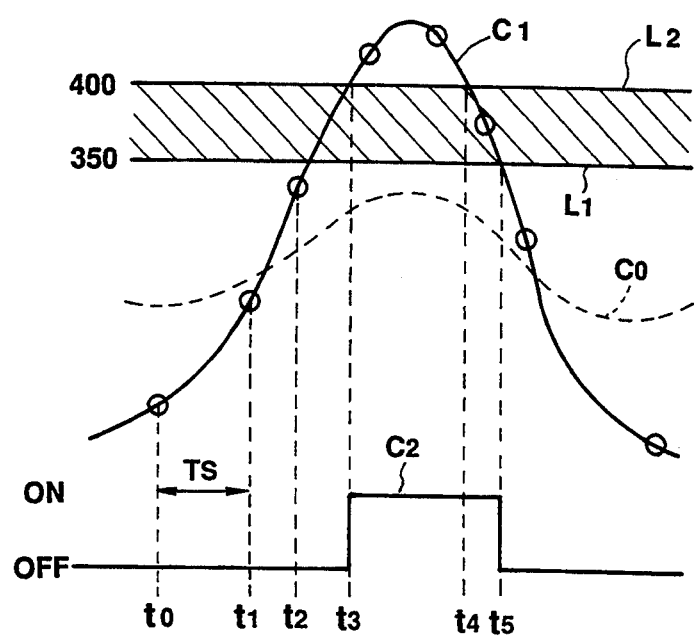
FIG. 14 is a diagram used in explaining the process for producing an alarm.

It is now assumed that the characteristic feature is the position of the gravity center of the equivalent area. The inference section 60 compares this characteristic feature hysteretically with a higher value L2 (400 pixels) of an upper limit when the characteristic feature is increasing and with a lower value L1 (350 pixels) of the upper limit when the characteristic feature is decreasing, as shown in FIG. 14. No alarm is produced from the alarm unit 66 as long as the characteristic feature varies below the upper limit, as indicated by the curve Co of FIG. 14. If the characteristic feature exceeds the upper limit, as indicated by the curve C1 of FIG. 14. The inference section 60 produces a command causing the alarm unit 66 to produce an alarm so as to indicate that the welding condition is defective. The inference section 60 may be arranged to infer a cause of the defective welding condition based upon the characteristic feature changing out of the acceptable range defined by the upper limit. In this case, the inference section 60 indicates the inferred cause on the display unit 64.

Figure 15:
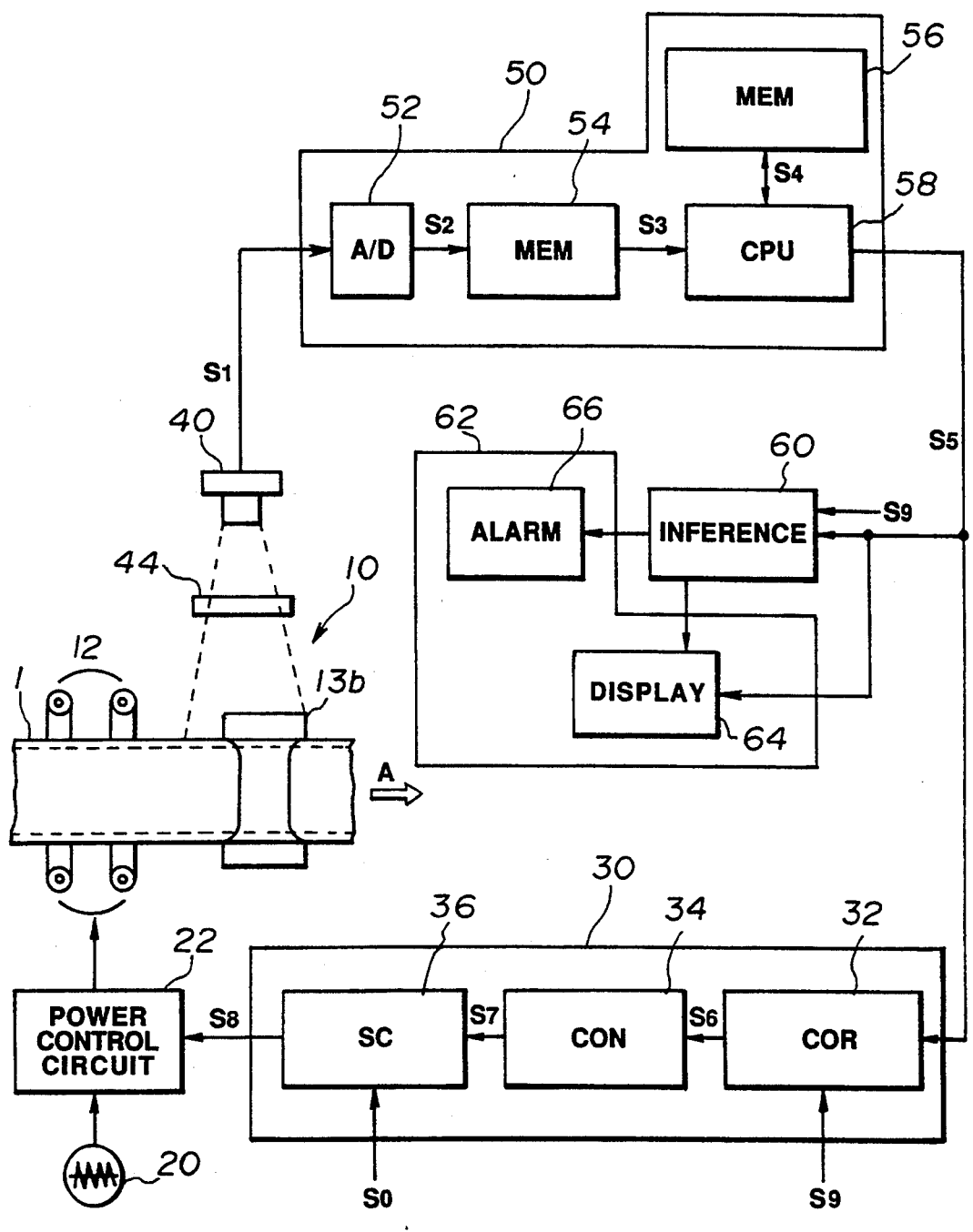
FIG. 15 is a schematic block diagram showing a third embodiment of the welding management apparatus of the invention.
Figure 16:
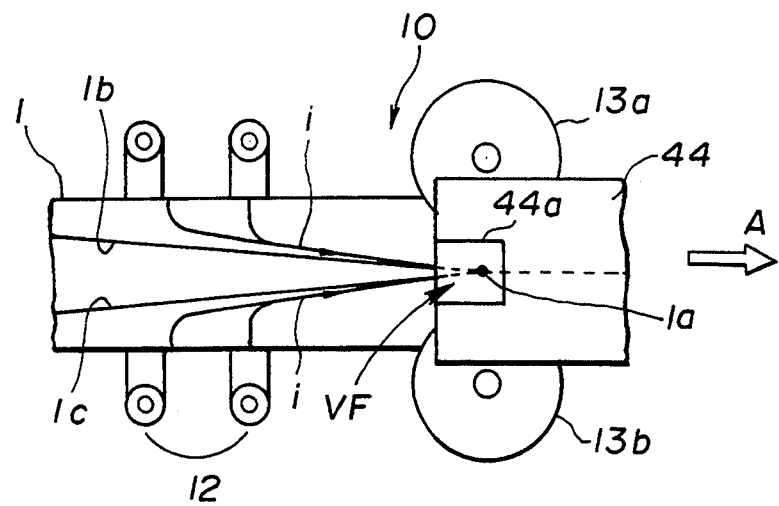
FIG. 16 is a fragmentary plan view showing a visual field of a camera used in the welding management apparatus of the invention.
Figure 17:
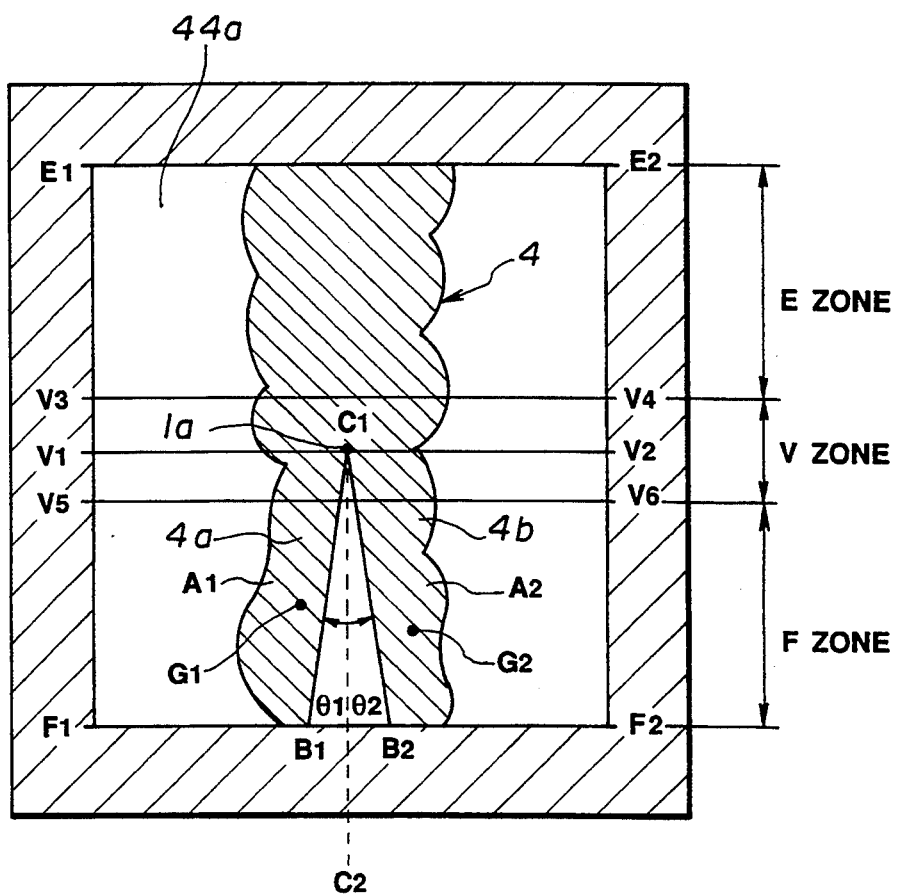
FIG. 17 is a fragmentary plan view showing a welding heat condition which may appear in the visual field of the camera.
Figure 18:
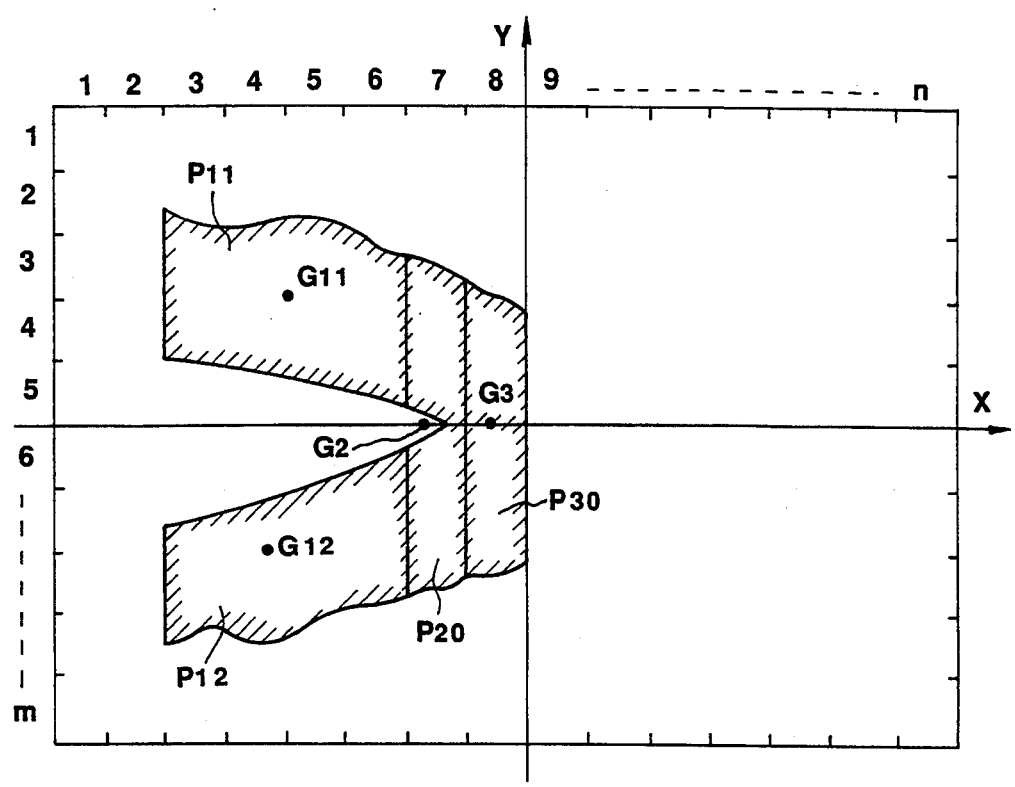
FIG. 18 is a diagram showing a luminance distribution pattern produced in the image processor.

Referring to FIGS. 15 and 16, there is illustrated a third embodiment of the welding management apparatus of the invention. The third embodiment is substantially the same as the first embodiment except for a masking member 44 provided in front of the camera 40. The masking member 44 has a rectangular transparent window 44a. The transparent window 44a has parallel lines V1-V2, V3-V4 and V5-V6 to divide vidual field (VF), that is, the area of the transparent window 44a, into three zones V, E and F, as best shown in FIG. 17. These lines extend over the full length of the width of the transparent window in a direction normal to the workpiece feeding direction A, as best shown in FIG. 17. The line V1-V2 extends through the jointing point 1a of the workpiece 1. The V zone (center zone) is defined between the line V3-V4 and the line V5-V6. The E zone, which is defined between the line V3-V4 and the window edge line E1-E2, is positioned on the downstream side of the V zone. The F zone, which is defined between the line V5-V6 and the window edge line F1-F2, is positioned on the upstream side of the V zone. The line C1-C2 extends through the jointing point 1a in the workpiece feeding direction. One of the workpiece side surfaces is indicated by the line C1-B1 extending at an angle $\theta 1$ with respect to the line C1-C2. The other workpiece side surface is indicated by the line C1-B1 extending at an angle $\theta 2$ with respect to the line C1-C2. With the use of the masking member 44, the luminous area corresponding to the heated portion of the workpiece 1 is divided into three zones. FIG. 18 shows one example of luminance distribution patterns obtained for the welding condition shown in FIG. 17. The luminance distribution pattern including areas P11 and p12 correspond to the F zone of FIG. 17, the luminance distribution pattern including an area P20 corresponds to the V zone of FIG. 17, and the luminance distribution pattern including an area P30 corresponds to the E zone of FIG. 17.

In this embodiment, the image processing unit 50 is arranged to extract at least one of the following characteristic features:

(1) The area of the luminous area of the sum of the F, V and E zones, the position of the gravity center of the luminous area of the sum of the F, V and E zones, the length of the circumference of the luminous area of the sum of the F, V and E zones. These characteristic features correspond to the inputted (welding) heat.

(2) The angle $\theta 1$ and $\theta 2$ of the lines B1-C1 and B2-C1 with respect to the line C1-C2. To obtain the lines B1-C1 and B2-C1, the image in the area V5-V6-F2-F1 may be differentiated. The areas A1 and A2 of the luminous areas 4a and 4b. These characteristic features correspond to the degree to which the workpiece formation is balanced and the angle of the V throat.

(3) The position of the gravity center of the area V3-V4-V6-V5. This characteristic feature corresponds to the magnitude of the upsetting pressure.

(4) The image in the area E1-E2-V4-V3 is differentiated to determine the presence of slits. If slits are produced frequency, it will mean that the inputted (welding) heat is excessive.

Figure 19:
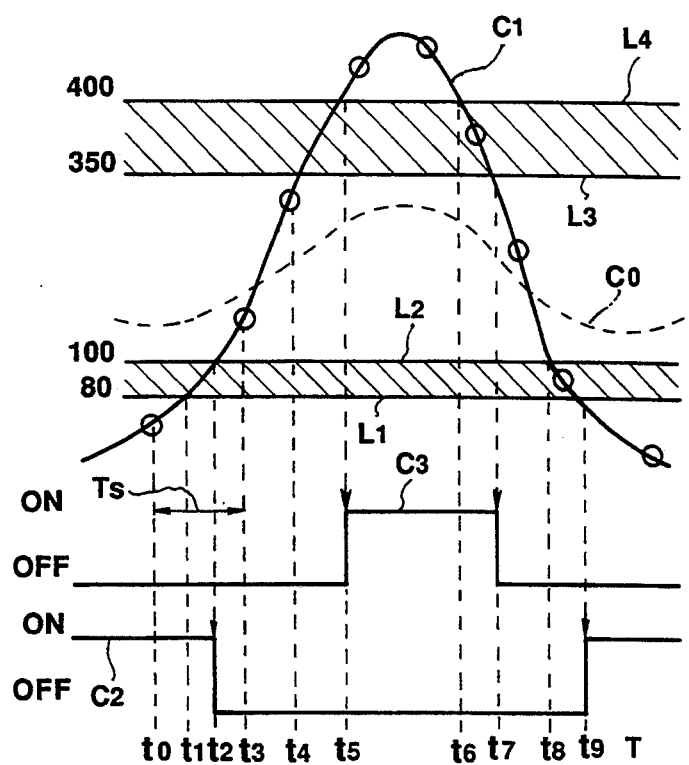
FIG. 19 is a diagram used in explaining the process for producing an alarm.
Figure 20:
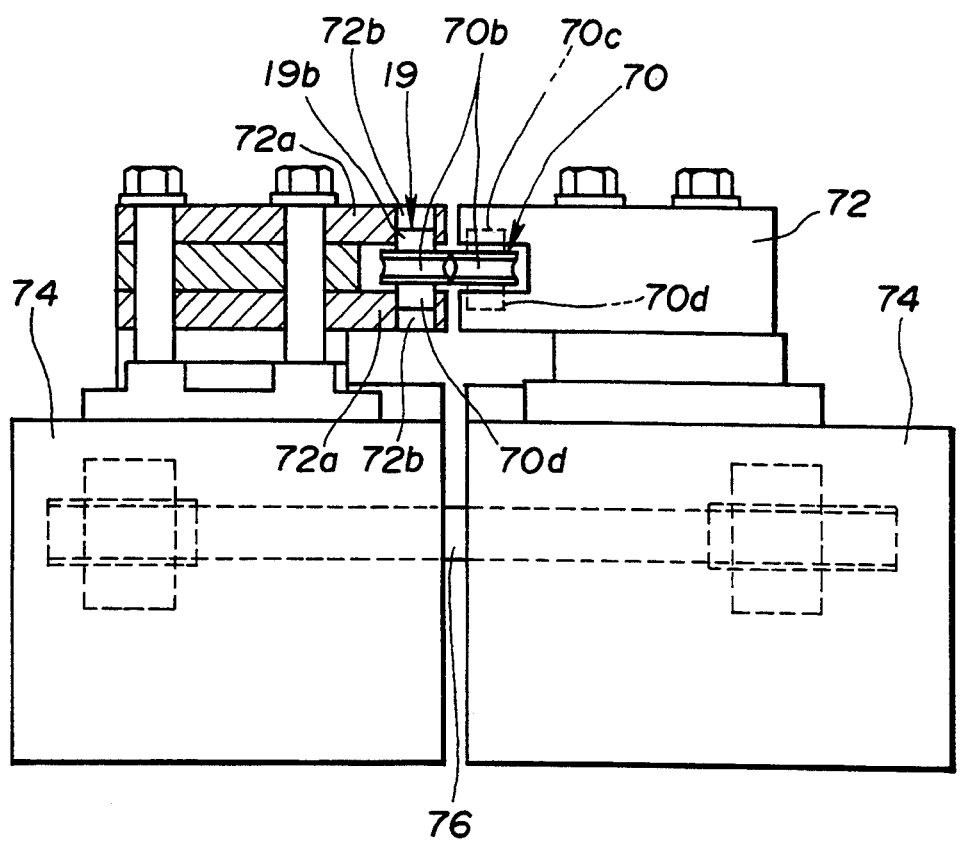
FIG. 20 is a sectional view showing a specified form of the squeeze roller arrangement.
Figure 21:
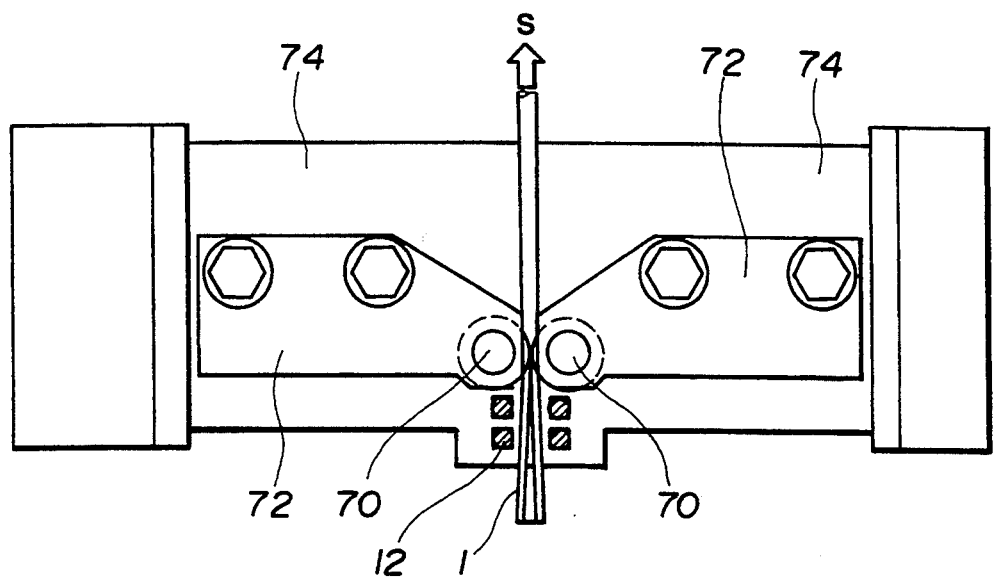
FIG. 21 is a plan view showing the squeeze roller arrangement of FIG. 20.
Figure 22:
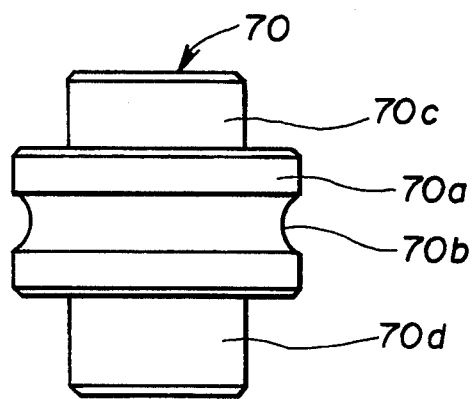
FIG. 22 is an enlarged elevational view showing the squeeze roller included in the squeeze roller arrangement of FIG. 20.

It is now assumed that the characteristic feature is the position of the gravity center. The inference section 60 compares this characteristic feature hysteretically with a higher value L2 (100 pixels) of the lower limit when the characteristic feature is increasing and with a lower value L1 (80 pixels) of the lower limit when the characteristic feature is decreasing, as shown in FIG. 19. Similarly, the inference section 60 compares the characteristic feature hysteretically with a higher value L4 (400 pixels) when the characteristic feature is increasing and with a lower value L3 (350 pixels) when the characteristic feature is decreasing. No alarm is produced from the alarm unit 66 as long as the characteristic feature varies within the acceptable range defined between the upper and lower limits, as indicated by the curve Co of FIG. 19. If the characteristic feature is out of the acceptable range, as indicated by the curve C1 of FIG. 19, the inference section 60 produces a command causing the alarm unit 66 to produce an alarm so as to indicate that the welding condition is defective.

The inference section 60 may be arranged to infer a cause of the defective welding condition based upon the characteristic feature changing out of the acceptable range defined between the upper and lower limits. In this case, the inference section 60 indicates the inferred cause on the display unit 64.

Referring to Flays. 21 to 23, there is illustrated a fourth embodiment of the welding management apparatus of the invention. In this embodiment, the tube production machine employs a pair of squeeze rollers 70 each of which is a one-piece member having a cylindrical center portion 70a and upper and lower cylindrical end portions 70c and 70d extending coaxially from the upper and lower surfaces of the cylindrical center portion 70a. The cylindrical end portions 70c and 70d have a diameter somewhat shorter than the diameter $D_{SQR}$ of the cylindrical center portion 70a. The cylindrical center portion 70a is formed in its side peripheral surface with an annular groove 70b.

Figure 23:
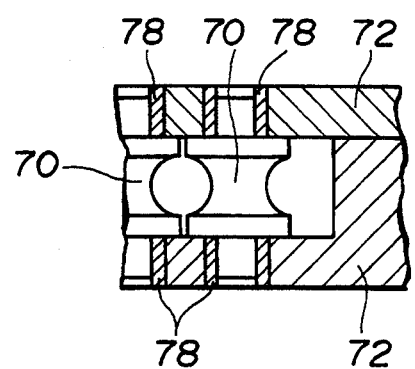
FIG. 23 is a fragmentary sectional view showing a modified form of the squeeze roller arrangement.

The squeeze rollers 70 are juxtaposed in parallel with each other so as to applying an appropriate upsetting pressure to the curved workpiece 1 passing the space defined by the annular grooves 70b of the respective squeeze rollers 70. The squeeze rollers 70 are supported on separate roller holders 72 each of which has upper and lower rigid arms 72a extending in spaced-parallel relation to each other. The upper and lower rigid arms 72a are formed near their ends with coaxial holes 72b for receipt of the upper and lower end portions 70c and 70d. The squeeze roller 70 is supported rotatably between the upper and lower arms 72a with its upper and lower end portions 70b and 70c inserted in the respective holes 72b. The roller holders 72 are bolted on respective sliders 74 mounted for sliding movement on a roller stand (not shown). A conventional sliding mechanism, for example, of the type including a screw rod 76, is provided to move the sliders 74 toward and away from each other so as to adjust the distance between the squeeze rollers 70 and thus the upsetting pressure applied to the workpiece 1. This arrangement can reduce the size of the squeeze rollers 70 without any reduction in their strength. It is, therefore, possible to place the squeeze rollers 70 closer to the induction coil 12 without interference of the squeeze rollers 70 with the induction coil 12 so as to improve the welding heat efficiency. It is also possible to produce small-diameter tubes having a diameter of 8 mm or less for which the conventional apparatus cannot be used. It is preferable to avoid induction heating of the squeeze rollers 70 by making the squeeze rollers of an insulating material such as ceramics. It is also preferable to provide bushes 78 for bearing the squeeze rollers 70, as shown in FIG. 23. The bushes 78 may be made of special bearing metal or the like.

Figure 24:
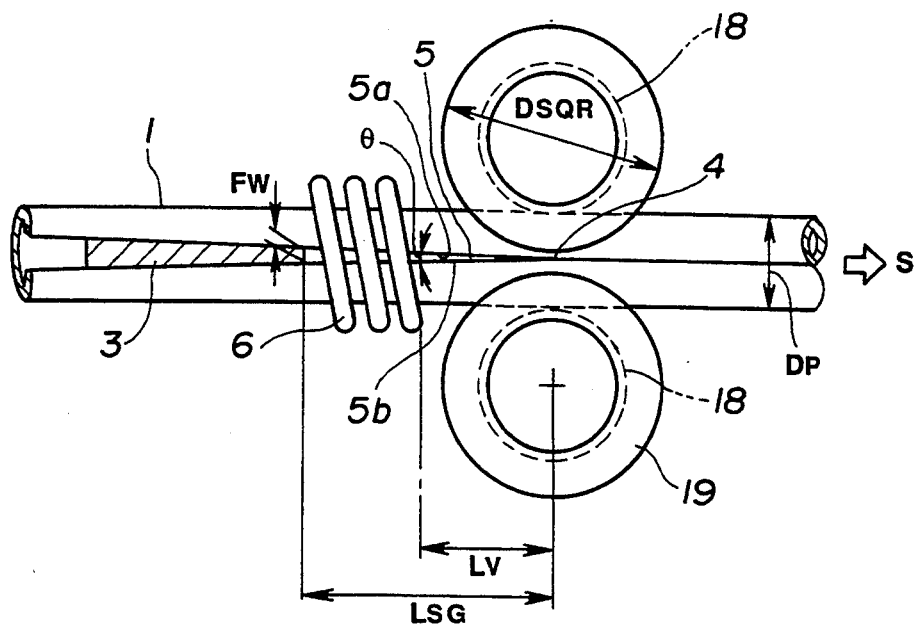
FIG. 24 is a fragmentary plan view showing the squeeze rollers used in the tube production machine.
Figure 25:
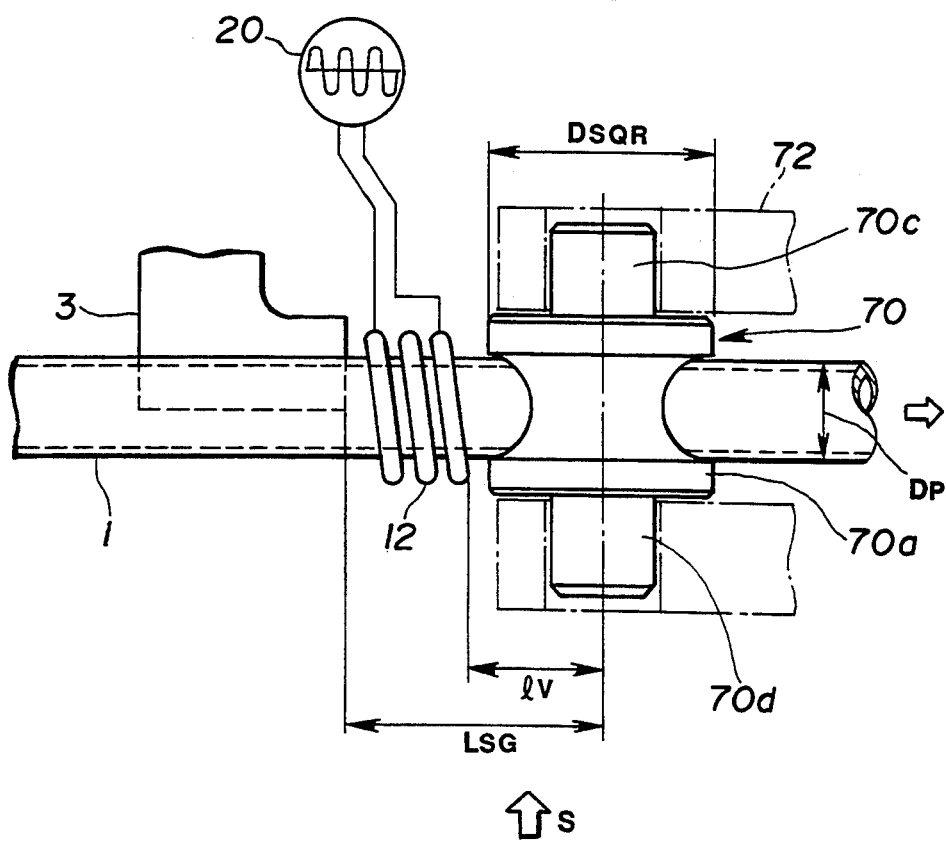
FIG. 25 is a fragmentary elevational view showing the squeeze rollers used in the tube production machine.

Referring to FIGS. 24 and 25, a small-diameter tube is produced while the curved workpiece 1 passes between the squeeze rollers 70. It is now assumed that the squeeze rollers 70 has a maximum diameter $D_{SQR}$ and the small-diameter tube has a diameter Dp. If the squeeze roller diameter $D_{SQR}$ increases, the distance $l_v$ of the induction coil 12 from the welding point 1a intermediate between the squeeze rollers 70 should be increased to avoid the interference of the squeeze roller 70 with the induction coil 12. The greater the distance $l_v$, the greater the resistance of the electric path extending from the induction passage 12 to the welding point 1a. As a result, the ratio of the current flowing to the welding point 1a to the current circulating through the workpiece 1 in the direction of the circumference of the curved workpiece 1 increases. Consequently, the welding heat produced at the welding point 1a decreases for the same power applied to the induction coil 12. In addition, the workpiece 1 is softened by the heat conducted over the entire area of the workpiece so that the V throat cannot be maintained at a constant angle $\theta$.

Figure 26:
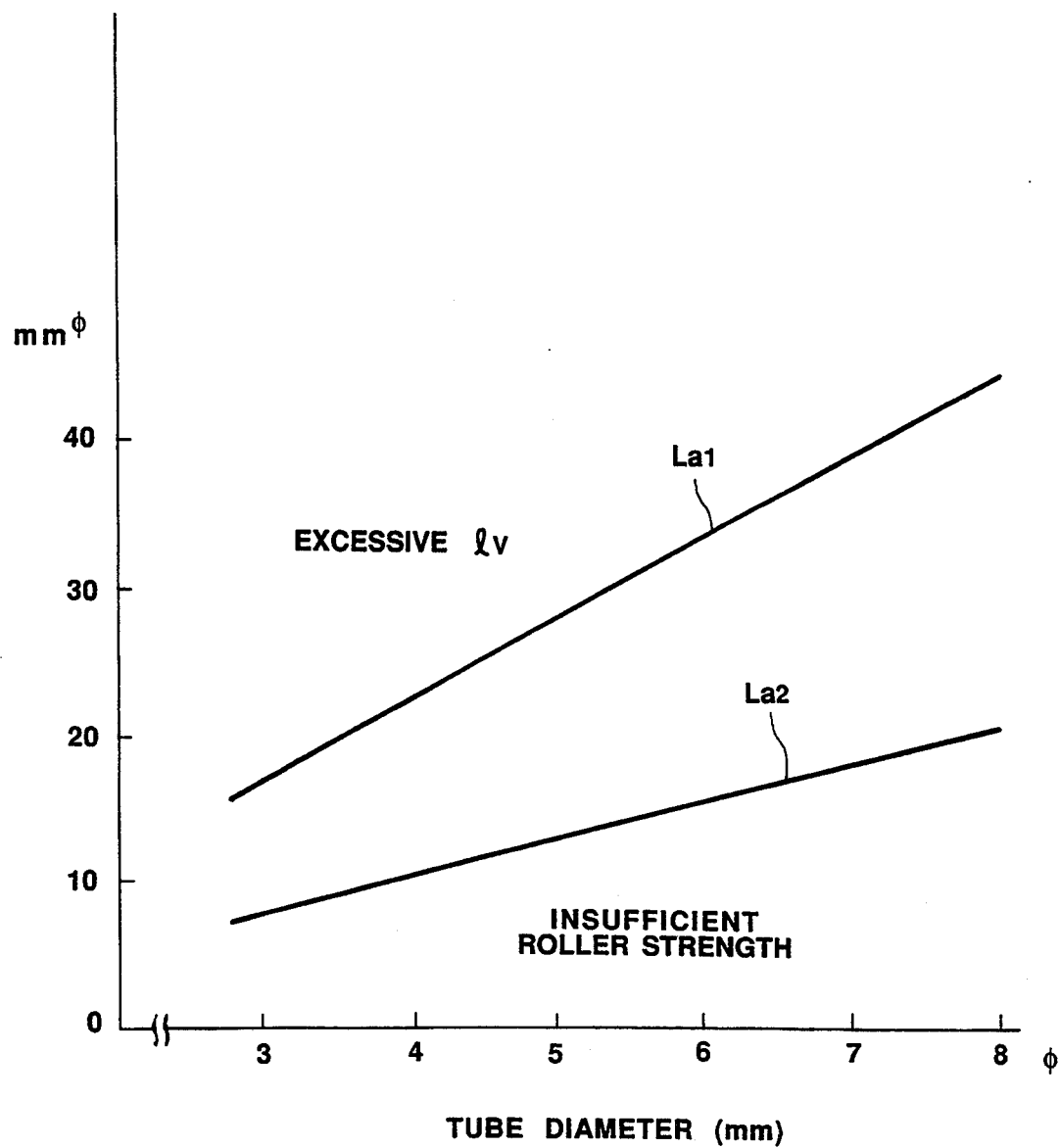
FIG. 26 is a graph of tube diameter versus squeeze roller diameter.

The inventors have discovered an acceptable range of the squeeze roller diameter $D_{SQR}$ from tests conducted to change the squeeze roller diameter $D_{SQR}$ for workpieces having various widths ranging from 11 mm to 25 mm. The test results are illustrated in FIG. 26. As can be seen from the test results, it is preferable that the squeeze roller diameter $D_{SQR}$ be in an acceptable range defined by first and second lines La1 and Lb1. The first line La1 is presented as 5.5×Dp and the second line Lb1 is presented as 2.5×Dp. Assuming now that the tube diameter Dp is 6.35 mm, the acceptable range of the squeeze roller diameter $D_{SQR}$ extends from 15.9 mm to 32.9 mm. Assuming now that the tube diameter Dp is 4 mm, the acceptable range of the squeeze roller diameter $D_{SQR}$ extends from 10.1 mm to 20.8 mm. If the squeeze roller diameter $D_{SQR}$ is greater than the acceptable range, the distance $l_v$ is too long. If the squeeze roller diameter $D_{SQR}$ is less than the acceptable range, the squeeze rollers 70 will have an insufficient strength against the reaction force produced in response to an upsetting pressure applied to the workpiece 1.

Figure 27:
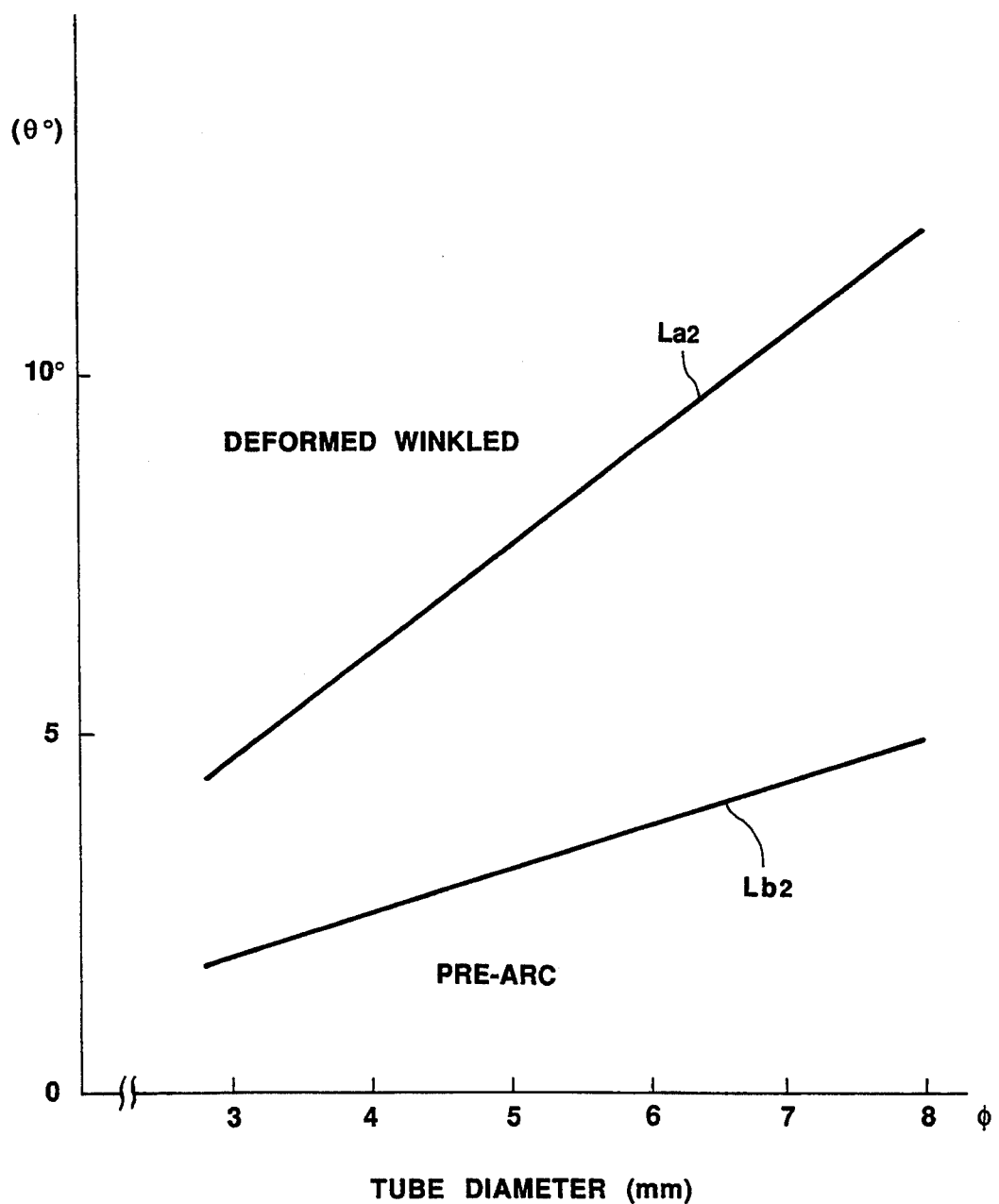
FIG. 27 is a graph of tube diameter versus V throat angle.

A seam guide 80 is placed between the opposite side surfaces 1b and 1c of the workpiece 1 to increase the angle $\theta$ of the V throat so as to shorten the distance Lsg. The inventors have discovered an acceptable range of the V throat angle $\theta$ from tests conducted to change the V throat angle $\theta$ for workpieces having various widths ranging from 11 mm to 25 mm. The test results are illustrated in FIG. 27. As can be seen from the test results, it is preferable that the V throat angle $\theta$ be in an acceptable range defined by first and second lines La2 and Lb2. The first line La2 is presented as 1.5×Dp and the second line Lb2 is presented as 0.6×Dp. Assuming now that the tube diameter Dp is 6.35 mm, the acceptable range of the V throat angle $\theta$ extends from 4.06° to 8.83°. Assuming now that the tube diameter Dp is 4 mm, the acceptable range of the V throat angle $\theta$ extends from 2.56° to 5.56°. If the V throat angle $\theta$ is greater than the acceptable range, the wrinkles or deformations occur on the opposite side surfaces 1b and 1c of the workpiece 1. If the V throat angle $\theta$ is less than the acceptable range, pre-arc occurs in the V throat of the workpiece 1 to degrade the welding quality.

Figure 28:
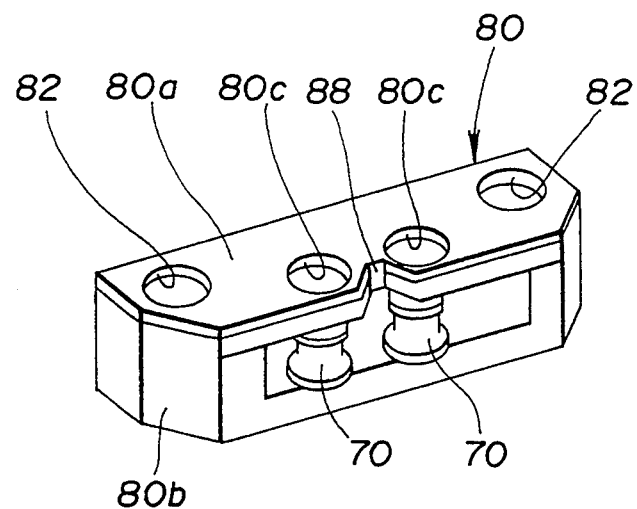
FIG. 28 is a perspective view showing a modified form of the squeeze roller arrangement.
Figure 29:
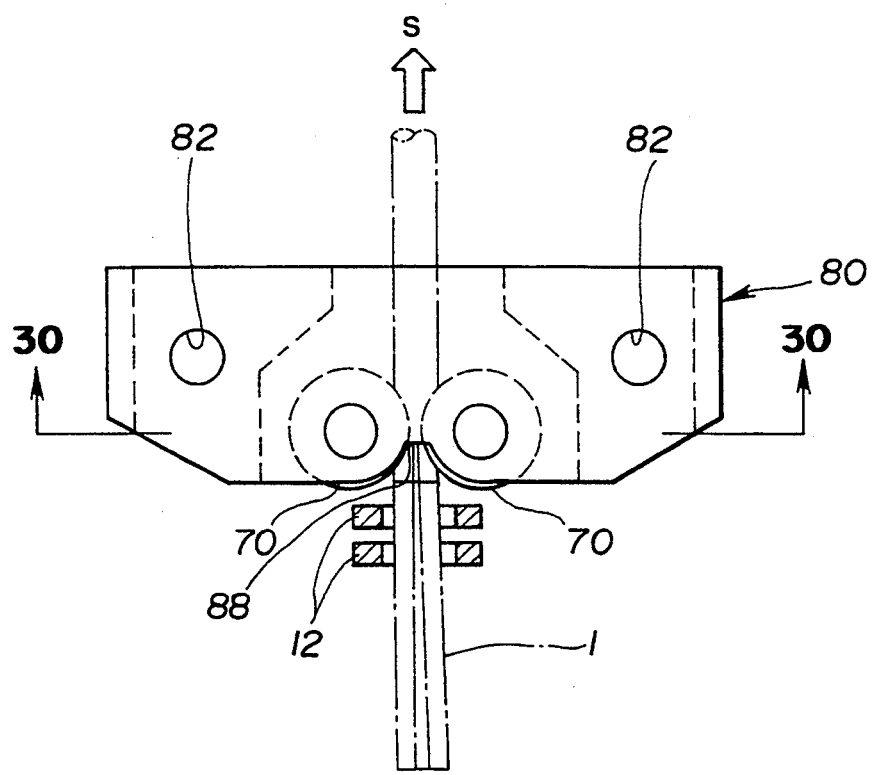
FIG. 29 is a plan view of the squeeze roller arrangement of FIG. 28.
Figure 30:
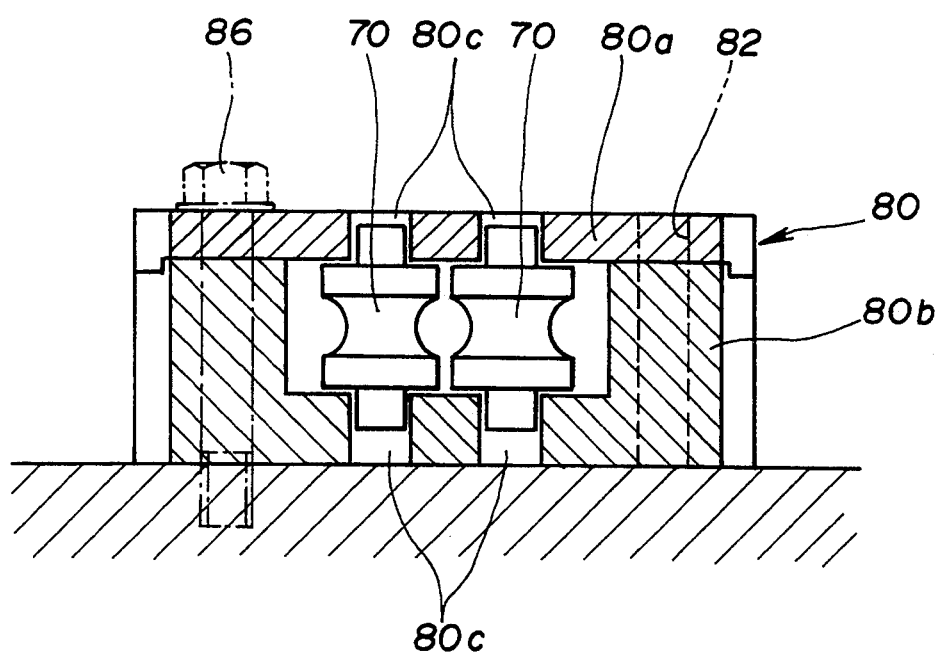
FIG. 30 is a sectional view of the squeeze roller arrangement of FIG. 28.

Referring to FIGS. 28 to 30, there is illustrated a fifth embodiment of the welding management apparatus of the invention. In this embodiment, the squeeze rollers 70 are supported in a cassette holder 80. The cassette holder 80 includes a lower member 80a and an upper member 80b fixed on the lower member 80a to form a box-shaped holder. The upper and lower members 80a and 80b are formed near their centers with a pair of coaxial holes 80c for receipt of the upper and lower end portions 70c and 70d. The squeeze roller 70 is supported rotatably between the upper and lower members 80a and 80b with its upper and lower end portions 70b and 70c inserted in the respective holes 80c. The cassette holder 80 is fixed on a roller stand by means of bolts 86 extending through bolts holes 82 formed in the upper and lower members 80a and 80b. Thus, the distance between the squeeze rollers 70 are fixed at a predetermined appropriate value. The numeral 88 designates a cutout formed in the upper member 80a intermediate between the holes 80c. The cutout 88 is effective to monitor the welding point 1a therethrough and escape spatters therethrough.

This arrangement can reduce the size of the squeeze rollers 70 without any reduction in their strength. It is, therefore, possible to place the squeeze rollers 70 closer to the induction coil 12 without interference of the squeeze rollers 70 with the induction coil 12 so as to improve the welding heat efficiency. It is also possible to produce small-diameter tubes having a diameter of 8 mm or less for which the conventional apparatus cannot be used.

While the invention has been described in conjunction with specific embodiments thereof, it is evident that many alternatives, modifications and variations will be apparent to those skilled in the art. Accordingly, it is intended to embrace all alternatives, modifications and variations that fall within the scope of the appended claims.

What is claimed is:

1. A tube production machine comprising:
   means for forming a workpiece fed from a roll of metal strip in a tubular formation having side surfaces opposite to each other;
   a pair of squeeze rollers for providing an upsetting pressure to joint the opposite side surfaces of the workpiece at a jointing point, each of the squeeze rollers being a one-piece member having a cylindrical center portion and upper and lower cylindrical end portions extending coaxially in opposite directions from the cylindrical center portion, the upper and lower cylindrical end portions being formed for rotation in unison with the cylindrical center portion, the cylindrical center portion being formed in a side peripheral surface with an annular groove to define a path for the workpiece along with the annular groove of the other squeeze roller;
   a roller holder for bearing each of the squeeze rollers at the cylindrical end portions thereof; and
   means for supplying a high frequency power to the workpiece to weld the opposite side surfaces at the jointing point so as to produce a metal tube member.

2. The tube production machine as claimed in claim 1, wherein the roller holder includes first and second sections for bearing the respective squeeze rollers, the first and second sections being mounted for sliding movement toward and away from each other to position the squeeze rollers at an adjustable distance.

3. The tube production machine as claimed in claim 1, where the roller holder is a single member for supporting the squeeze rollers at a predetermined distance.

4. The tube production machine as claimed in claim 1, wherein the center portion has a largest diameter set within a range defined by first and second limits, the first limit being presented as 5.5×Dp, the second limit being presented as 2.5×Dp where Dp is the outer diameter of the tube to be produced.

5. The tube production machine as claimed in claim 1, wherein the opposite side surfaces make an angle set within a range defined by first and second limits, the first limit being presented as 1.5×Dp, the second limit being presented as 0.6×Dp where Dp is the outer diameter of the tube to be produced.

6. The tube production machine as claimed in claim 5, wherein the center portion has a largest diameter set within a range defined by third and fourth limits, the third limit being presented as 5.5×Dp, the fourth limit being presented as 2.5×Dp where Dp is the outer diameter of the tube to be produced.

7. The tube production machine as claimed in claim 1, wherein at least one of the squeeze rollers is made of an insulating material.

8. The tube production machine as claimed in claim 7, wherein the insulating material is a ceramic.

9. The tube production machine as claimed in claim 1, wherein the roller holder bears each of the squeeze rollers at an outer circumferential surface of the cylindrical end portions.

* * * * *